(12) United States Patent  
Ishii et al.

(10) Patent No.: US 8,325,443 B2  
(45) Date of Patent: Dec. 4, 2012

(54) MAGNETIC DISK DEVICE WITH MAGNETIC HEAD SLIDER HAVING TRAILING SIDE FACE PART WITH REDUCED WETTABILITY

(75) Inventors: Eiji Ishii, Hitachinaka (JP); Mari Uchida, Tsuchiura (JP); Masanori Ishikawa, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 95 days.

(21) Appl. No.: 12/700,757

(22) Filed: Feb. 5, 2010

(65) Prior Publication Data

US 2010/0202085 A1 Aug. 12, 2010

(30) Foreign Application Priority Data

Feb. 9, 2009 (JP) .................................. 2009-027303

(51) Int. Cl.
  *G11B 5/60* (2006.01)
  *G11B 15/64* (2006.01)
  *G11B 17/32* (2006.01)
  *G11B 21/20* (2006.01)
(52) U.S. Cl. ................ 360/235.1; 360/235.6; 360/235.7
(58) Field of Classification Search ............... 360/235.1, 360/235.7
See application file for complete search history.

(56) References Cited

U.S. PATENT DOCUMENTS

2005/0264937 A1* 12/2005 Chiba et al. ................ 360/235.1
2009/0046388 A1* 2/2009 Ogata et al. ................ 360/234.3

FOREIGN PATENT DOCUMENTS

| JP | 08-087847 | 4/1996 |
| JP | 09-063030 | 3/1997 |
| JP | 10-293982 | 11/1998 |
| JP | 2001-357510 | 12/2001 |

* cited by examiner

*Primary Examiner* — Joseph Feild  
*Assistant Examiner* — Gustavo Polo  
(74) *Attorney, Agent, or Firm* — Antonelli, Terry, Stout & Kraus, LLP.

(57) ABSTRACT

A magnetic disk device includes a magnetic disk and a magnetic head having a magnetic head slider flying by an action of air during rotation of the magnetic disk, wherein an inflow of air from a direction of a leading side face of the magnetic head slider forming an air bearing film effect at an air bearing surface face of the magnetic head slider which faces the magnetic disk, and the air flows out from a trailing side face of the magnetic head slider. The magnetic head slider has a wettability, in at least a part of an outer region defined on the trailing side face and adjoining other faces including the air bearing surface face of the magnetic head slider, which is lower than a wettability of at least one other region present at the trailing side face.

8 Claims, 10 Drawing Sheets

MAGNETIC DISK DEVICE WITH MAGNETIC HEAD SLIDER HAVING TRAILING SIDE FACE PART WITH REDUCED WETTABILITY

CLAIMS OF PRIORITY

The present application claims priority from Japanese patent application serial no. JP2009-027303, filed on Feb. 9, 2009, the content of which is hereby incorporated by reference into this application.

BACKGROUND OF THE INVENTION

The present invention relates generally to magnetic disk devices, and more particularly, to a magnetic disk device suitable for preventing trouble from arising from use of a lubricant when flying height of a magnetic head is reduced for enhanced recording density.

In magnetic disk devices each including magnetic head sliders, density at which information can be recorded on a magnetic disk will increase as the clearance between the spinning magnetic disk and a magnetic head for recording/reading information on/from the magnetic disk is narrowed. Therefore, the clearance between the magnetic disk and the magnetic head, that is, the flying height of the magnetic head is continuing to be increased. The surface of the magnetic disk is coated with a lubricant to protect magnetically recorded information from damage due to contact with the magnetic head slider.

A magnetic disk device according to a conventional technique, and a lubricant used in the conventional magnetic disk device are described below with reference to FIGS. 17 to 19.

FIG. 17 is a configuration diagram of a general magnetic disk device.

FIG. 18 is a perspective view showing a distal end of a magnetic head 5.

FIG. 19 is a perspective view of the magnetic disk device according to the conventional technique.

As shown in FIG. 17, a plurality of magnetic disks 1 are fixed in stacked form to a magnetic disk rotating shaft 2 connected to a spindle motor (not shown). An arm 4 is actuated about an arm rotating shaft 3. The arm 4 fixed at one end thereof to the arm rotating shaft 3 has a coil (not shown) to actuate the arm 4, and this coil and magnets provided near a housing 10 form a voice coil motor 6 to generate actuating force. The coil, the magnets, and the voice coil motor constitute a rotary actuator. A magnetic head 5 for magnetic disk read/write use is provided at a front end of the arm 4. The magnetic head 5 moves above a magnetic disk 1 to conduct magnetically recorded information read/write operations thereupon. During standby, the magnetic head is stored in a load/unload region 7.

The perspective view showing the distal end of the magnetic head 5 in FIG. 17 represents the distal end existing when viewed from a direction of the magnetic disk 1. A magnetic head slider 8 with a read/write element formed thereon is provided at the distal end of the magnetic head 5. While the magnetic head slider 8 uses an air film lubrication effect to fly along the surface of the magnetic disk 1, the magnetic head conducts magnetically recorded information read/write operations upon the surface of the magnetic disk 1.

FIG. 19 shows the magnetic head slider 8 of FIG. 18 that exists when viewed from a direction of the magnetic disk 1 (i.e. from an upward direction of the slider in FIG. 18). The magnetic head slider 8 has pads 9, through which, an inflow of air from a direction of an arrow in FIG. 19 enters a spatial gap between the magnetic head slider 8 and the magnetic disk 1, proximate to a leading side face 43 of the slider, thus forming an air bearing film effect on an air bearing face 20 of the slider. Therefore, the air flows out from a trailing side face 13 of the slider in FIG. 19. The air bearing film enables the magnetic head slider 8 to fly above the magnetic disk 1.

As described above, the flying height of the magnetic head slider 8 above the magnetic disk 1 has been significantly reduced in recent years. This is causing the event that a part of the lubricant on the magnetic disk is stirred up into the air and sticks to the magnetic head slider. The lubricant sticking thereto poses two serious problems. A first problem is that wetting with the lubricant begins to spread from the surface of the magnetic head slider to an air bearing surface and resultingly changes the flying height. A second problem is that vibration of the magnetic head slider or a flow of surrounding air causes any droplets of the lubricant to fall onto the disk, thus permits the magnetic head slider to get on the disk, and results in a crash.

With respect to the above first problem, JPA-1998-293982 proposes a magnetic disk device that includes magnetic head sliders. According to JP-A-1998-293982, the magnetic disk device described therein is effective for preventing a lubricant from sticking to a trailing edge of a magnetic head slider, since an angle between an air bearing surface and the trailing edge is reduced below 70 degrees to create a smooth airflow near the trailing edge. However, the magnetic disk device disclosed in JP-A-1998-293982 is unable to completely prevent the lubricant from sticking to the magnetic head slider, and has the problem that when the magnetic disk stops rotating, wetting with the lubricant sticking to the trailing edge will spread to the air bearing surface.

In addition, with respect to the above second problem, JP-A-1996-87847 proposes a magnetic head slider constructed so that one face of the slider that connects to a trailing edge thereof above an air bearing surface includes means for retaining a lubricant sticking to the slider. The face of the slider that connects to the trailing edge thereof has a groove or protrusion as the lubricant retaining means. According to JP-A-1996-87847, this suppresses entry of the lubricant sticking to and deposited on the magnetic head, into an interface between the surface of the magnetic disk under a stopped state and the air bearing surface of the magnetic head, thereby enabling stiction to be avoided.

However, even the magnetic head slider described in JP-A-1996-87847 has a problem in that if the groove or protrusion that is the lubricant retaining means has uniform wettability over its entire surface or if the surface in contact with the air bearing surface has high wettability and the lubricant has a nature to spread its wetting, the retained lubricant will spread to the air bearing surface under the stopped state of the disk.

The present invention has been made in order to solve the above problems, and is intended to provide a highly reliable magnetic disk device including a magnetic disk coated with a lubricant, the disk device being adapted to prevent a wetting spread of the lubricant to an air bearing surface and hence, a fall of the lubricant from a magnetic head slider.

SUMMARY OF THE INVENTION

In order to solve the above problems, the present invention provides a magnetic disk device constructed so that the magnetic head slider has lower wettability in all or part of an outer region defined on the trailing side face and adjoining other side faces of the slider, than in other regions present at the trailing side. Control of wettability in various regions of a trailing edge is implemented by applying an oil-repelling agent or a lipophilic agent or by changing surface roughness.

In highly wettable regions of the trailing edge, a wetting spread effect prevents formation of droplets of the lubricant and hence, a fall of any droplets thereof onto a magnetic disk due to vibration of the magnetic head slider or a flow of air. In addition, a wetting spread of the lubricant to an air bearing surface is prevented since a wetting spread of any droplets of the lubricant in the highly wettable regions of the trailing edge is blocked in the wettability-reduced region.

Furthermore, the trailing side face includes the wettability-reduced outer region constructed with a plurality of triangular shapes and disposed so that an area of each of the triangles increases in a direction of the air bearing surface on the magnetic head slider. When droplets of the lubricant are formed on the trailing side face, the droplets will move towards a more easily wettable region on a side opposite to the air bearing surface. This action prevents a wetting spread of any droplets of the lubricant to the air bearing surface.

Moreover, the trailing side face of the magnetic head slider includes a recess. Thus, any droplets sticking to the trailing side face will be retained in the recess by a surface tension effect, so that a fall or wetting spread of the droplets can be prevented.

In this way, the present invention can prevent a fall or wetting spread of the lubricant sticking to the magnetic head slider.

Additionally, a load/unload region that will have a face opposed to the trailing side face of the magnetic head slider when the slider is stored into the load/load region includes a protrusion as means for removing any lubricant components sticking to the slider, and wettability of the protrusion is increased above that of the trailing side face of the slider. Thus, wettability of any droplets of the lubricant sticking to the trailing side face will move the droplets to the load/unload region, making the sticking lubricant removable.

Even greater prevention effects against a fall and wetting spread of the lubricant can be achieved by combining the above-described aspects of the present invention that relate to the trailing side face of the magnetic head slider and to the load/unload region.

DESCRIPTION OF THE PREFERRED EMBODIMENTS

Embodiments of the present invention will be described with reference to FIGS. 1 to 16.

(First Embodiment)

A first embodiment of the present invention is described below with reference to FIGS. 1 to 6.

FIGS. 1 to 4 are perspective views each showing a specific example of a magnetic head slider structure according to the first embodiment of the present invention.

Figure 5:
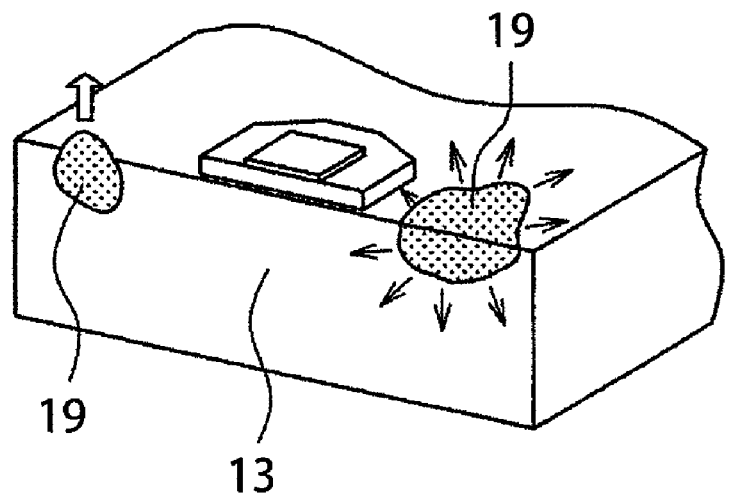
FIG. 5 is a diagram illustrating a behavior that a lubricant exhibits upon sticking to a trailing side face of a magnetic head slider according to a conventional technique.

FIG. 5 is a diagram illustrating a behavior that a lubricant exhibits upon sticking to a trailing side face of a magnetic head slider according to a conventional technique.

Figure 1:
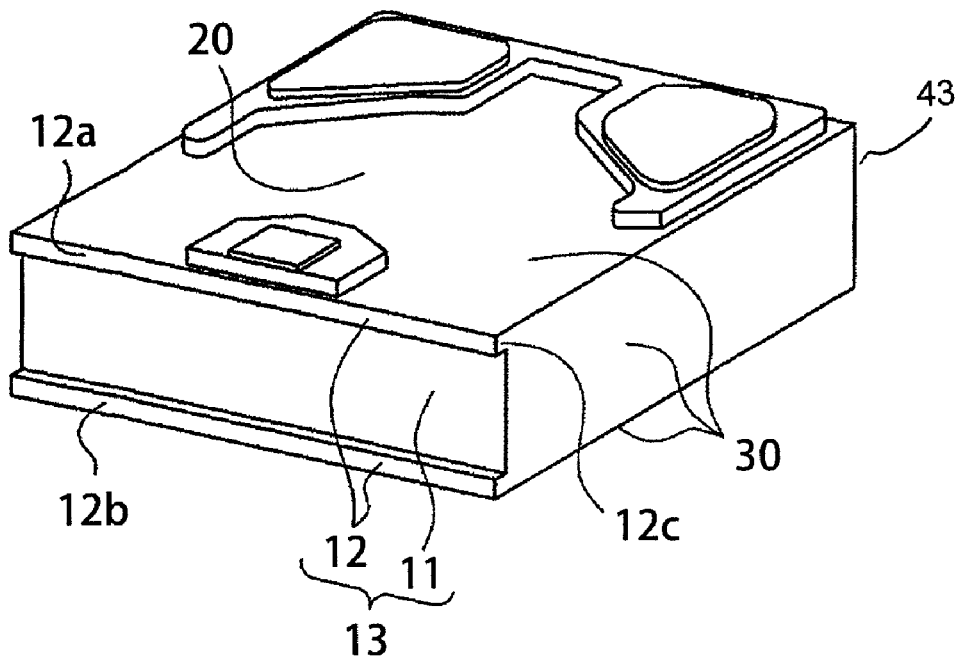
FIG. 1 is a perspective view showing an example of a magnetic head slider structure according to a first embodiment of the present invention.
Figure 6:
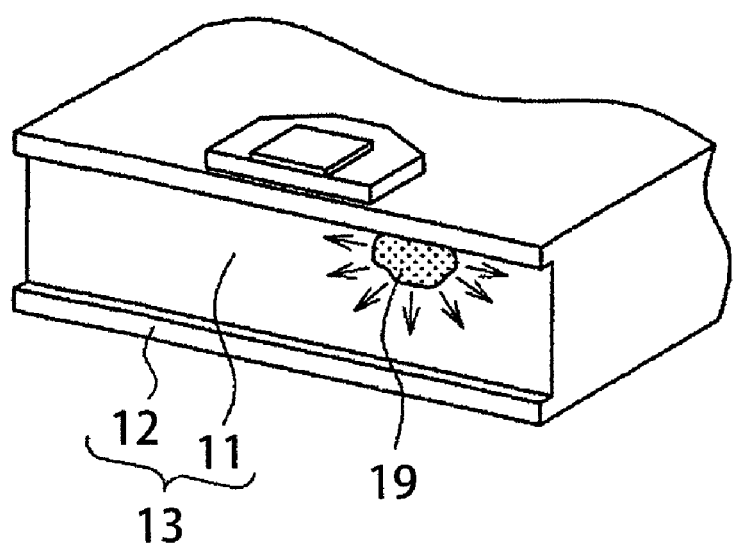
FIG. 6 is a diagram illustrating a behavior that a lubricant exhibits upon sticking to a trailing side face of the magnetic head slider in FIG. 1.

FIG. 6 is a diagram illustrating a behavior that a lubricant exhibits upon sticking to a trailing side face of the magnetic head slider in FIG. 1.

In the present invention, the trailing side face 13 of the magnetic head slider 8 shown in FIG. 1 has protrusions 12 at both upper and lower edges of the face 13. At the protrusions 12, surface wettability of a face 12a adjoining an air bearing surface (an upper face in FIG. 1) is reduced below surface wettability of other regions (a face 12c orthogonal to the face 12a, and a region 11). The other regions have surface wettability that allows any sticking droplets of the lubricant to provide a sufficient wetting spread, but to such an extent that the droplets do not fall. Additionally, the lubricant can be dwelled only on the trailing side face 13 by reducing the wettability of the face 12b of the lower protrusion 12. In the present invention, all or part of an outer region adjoining other faces 30, at the trailing side face 13, has thus reduced wettability.

FIGS. 5 and 6 represent a difference in effectiveness between the magnetic head slider according to the conventional technique and the magnetic head slider of the present embodiment. FIG. 5 shows a structure of the magnetic head slider in the conventional technique. This conventional slider has problems in that a droplet 19 of the lubricant, sticking to the trailing side face 13, is liable to fall owing to vibration of the magnetic head slider or a flow of surrounding air, as with the left droplet in FIG. 5, or to spread to an air bearing surface, as with the right droplet in FIG. 5. FIG. 6 represents the effectiveness of the magnetic head slider used in the present embodiment. In this case, a fall of any droplets of the lubricant due to vibration of the magnetic head slider or a flow of surrounding air can be prevented since any droplets of the lubricant that have stuck to the trailing side face 13 are retained by the protrusions 12. In addition, when the device is in a stationary state, the relatively high surface wettability of the region 11 spreads wetting with the sticking droplets of the lubricant and does not let the droplets grow in size. Furthermore, since the surface wettability of the face 12a at the protrusions 12 that is adjoining the air bearing surface (upper face in FIG. 6) is reduced, wetting with the lubricant sticking to the region 11 can be prevented from spreading to the air bearing surface.

As described above, the magnetic head slider in the present embodiment has protrusions 12 in both upper and lower places on the slider, and the faces 12a, 12b that form top edges of the protrusions are reduced in wettability. Thus, wetting with any droplets of the lubricant that have stuck to the trailing side face can be prevented from spreading to the air bearing surface. A wetting spread of the lubricant to a lower face of FIG. 1 (i.e., a face on a side opposite to the air bearing surface) can also be prevented. If wetting with the lubricant spreads to faces other than the air bearing surface, the lubricant is likely to fly about because of impacts of the surrounding air flow. However, this problem can likewise be solved by providing the protrusions 12.

Figure 2:
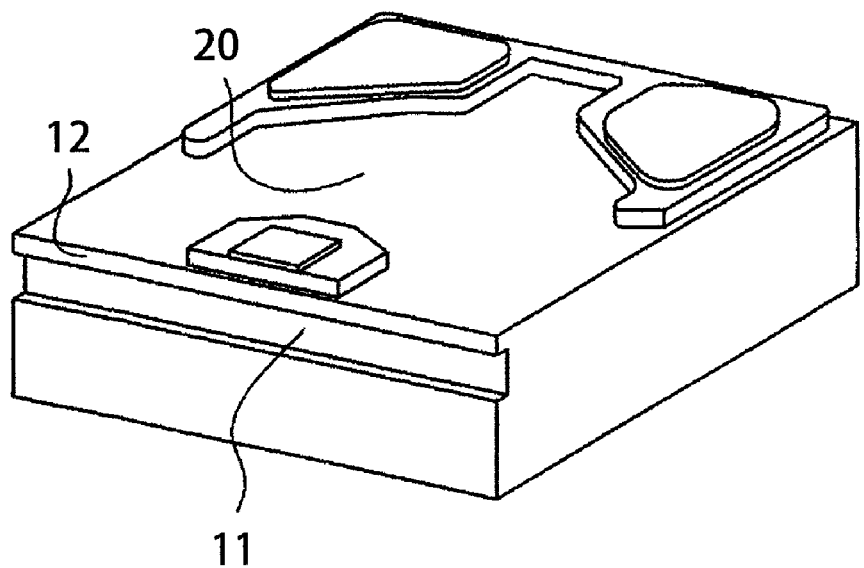
FIG. 2 is a perspective view showing another example of a magnetic head slider structure according to the first embodiment of the present invention.
Figure 3:
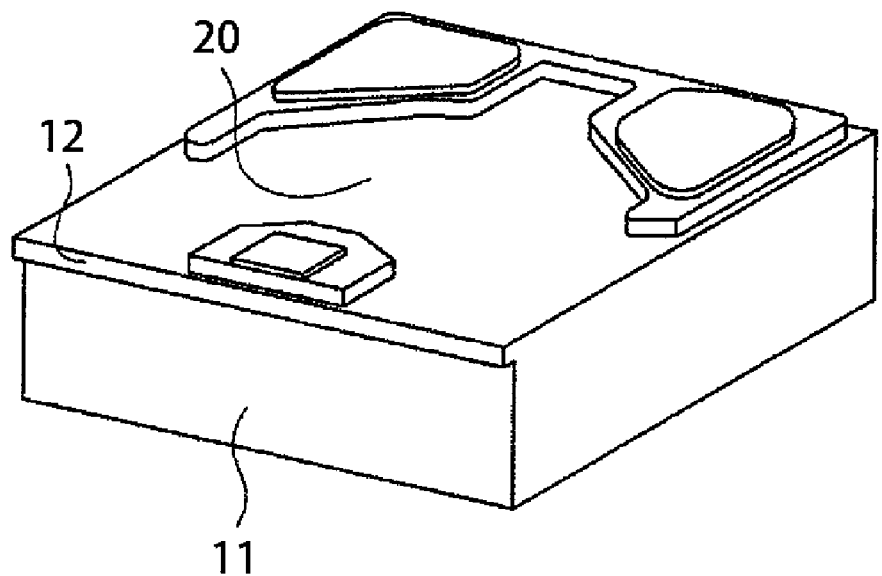
FIG. 3 is a perspective view showing yet another example of a magnetic head slider structure according to the first embodiment of the present invention.
Figure 4:
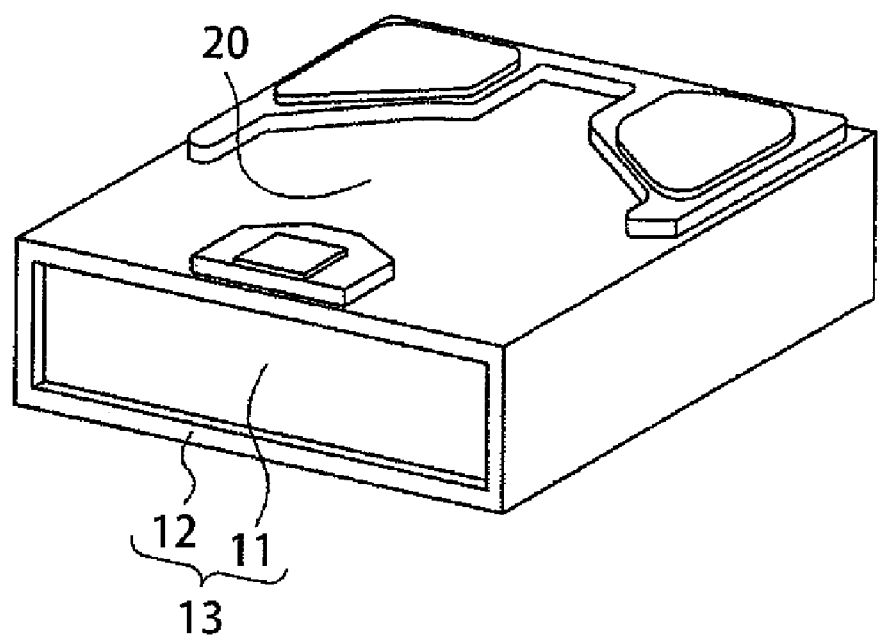
FIG. 4 is a perspective view showing a further example of a magnetic head slider structure according to the first embodiment of the present invention.

The magnetic head slider structures shown in FIGS. 2 and 3 are examples of changes to the protrusion layout shown in FIG. 1. In addition, the protrusions on the trailing side face of the magnetic head slider may be arranged either on four sides of the face, as in FIG. 4, or on three sides of the face. Under the magnetic head slider structures shown in FIGS. 2 and 3, if essentially the same mechanism as that of the magnetic head slider in FIG. 1 is adopted, the droplets of the lubricant that have stuck to the trailing side face can be prevented from falling onto the disk and from spreading to the air bearing surface and other faces.

An oil-repellent portion and a lipophilic portion are formed on the trailing side face 13. Specifically, such an oil-repellent portion and a lipophilic portion are formed by not only coating with an oil-repelling agent and a lipophilic agent, but also controlling surface roughness of a wall surface. In this case, lipophilicity can be enhanced by increasing surface roughness, and oil repellence can be enhanced by minimizing surface roughness. These effects can likewise be obtained by changing relative surface roughness and other characteristics of the member between corresponding members.

More specific processing methods for achieving the formation of the above oil-repellent portion and lipophilic portion include, for example, coating the surface of the member with an oil-repelling agent, providing chemical surface treatment, changing surface roughness mechanically by electric discharge machining or the like, or changing a feed rate and/or cutting depth of a lathe-machining tool nose. For shape patterning by electric discharge machining or the like, substantially the same effects can be achieved by increasing surface roughness of the surface to be subjected to the machining process, and making the machined surface more wettable than an unmachined one. Additionally, the wettability of the machined surface and unmachined surface can likewise be controlled by applying an oil-repelling agent to the entire patterned surface.

The roughness of the machined surface and the wettability of the lubricant itself are outlined below. For example, if a metal surface dropwise that has been changed in surface roughness by electric discharge machining is coated with a fixed amount of lubricant dropwise for comparison in wetting spread radius, the dropwise coat of lubricant will, on a machined surface with a maximum radius of 3.2 mm, expand nearly to a circular shape, but on a machined surface with a maximum radius of 25 mm or more, the dropwise coat of lubricant will lose its circular profile and spread to surface irregularities. On the machined surface with the 3.2-mm maximum radius, the droplet will expand along the member grains on the machined surface to assume essentially an elliptic shape. To enhance oil repellence using a method other than coating with an oil-repelling agent, it is necessary to minimize the roughness of the surface to be machined.

The methods outlined below are desirable for coating with an oil-repelling agent. When a commercially available oil-repelling agent is used, desired oil repellence can be obtained by curing the agent at a required temperature after coating the intended surface and drying. Forming an oil-repellent film on the trailing side face of the magnetic head slider can be accomplished, for example, by selectively coating a roughly planed surface with an oil-repelling agent or by creating a mask of a coating pattern and coating the surface to predetermined thickness. In whatever coating method, an excess of the oil-repelling agent is desirably removed by mechanical or chemical means to delineate a boundary of an oil-repellent region and a lipophilic region.

(Second Embodiment)

A second embodiment of the present invention is described below with reference to FIGS. 7 to 9.

Figure 7:
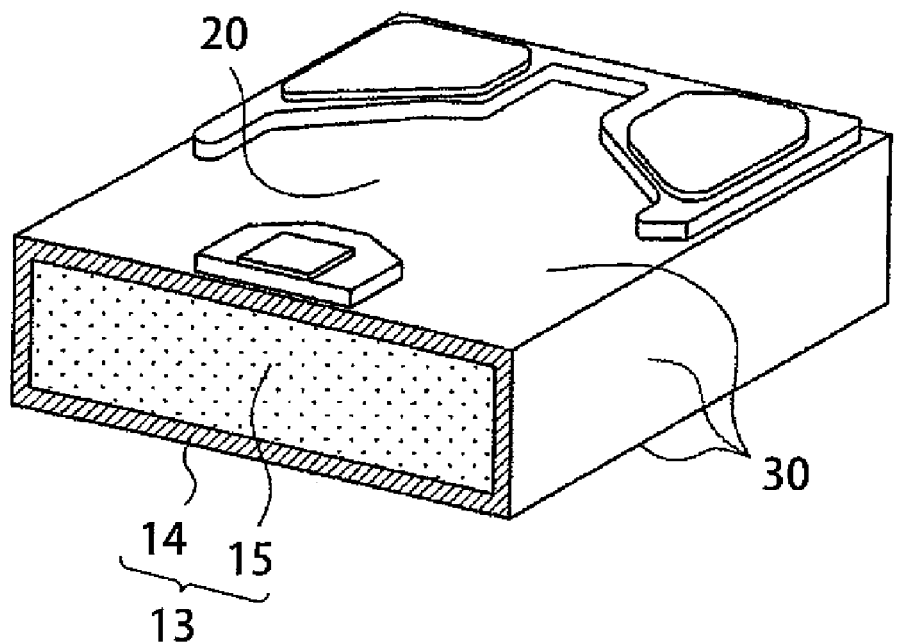
FIG. 7 is a perspective view showing an example of a magnetic head slider structure according to a second embodiment of the present invention.
Figure 8:
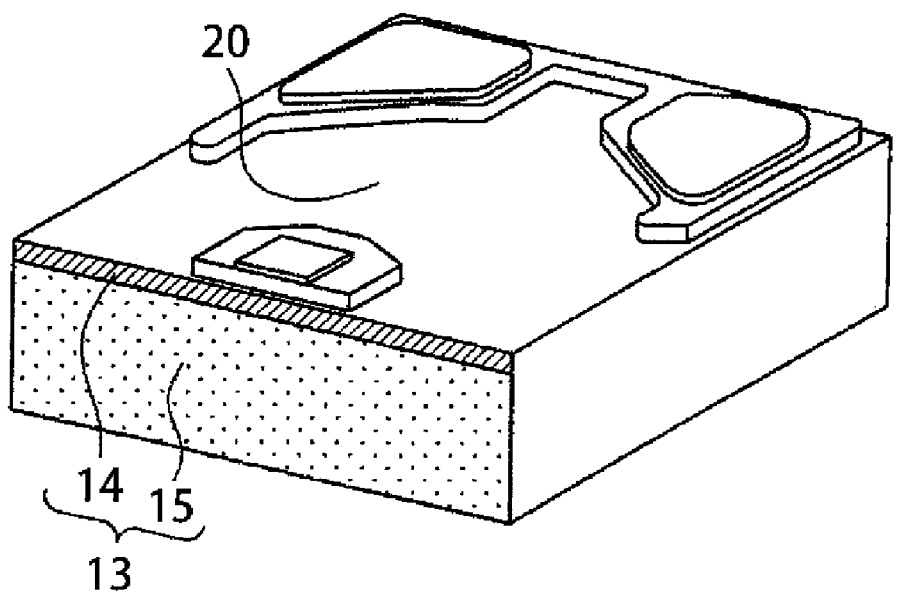
FIG. 8 is a perspective view showing another example of a magnetic head slider structure according to the second embodiment of the present invention.

FIGS. 7 and 8 are perspective views each showing a specific example of a magnetic head slider structure according to the second embodiment of the present invention.

Figure 9:
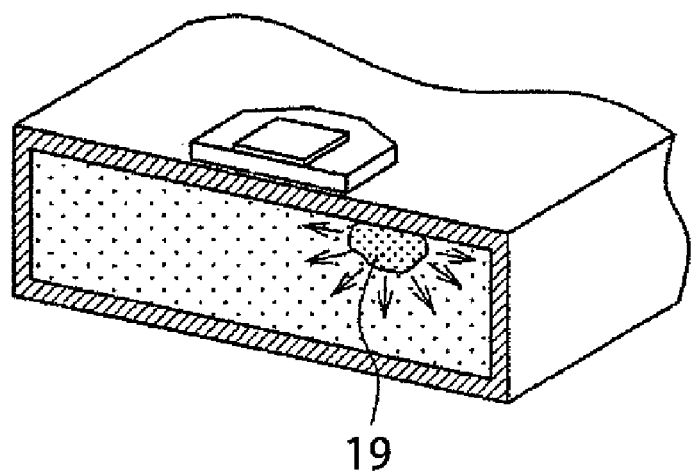
FIG. 9 is a diagram illustrating a behavior that a lubricant exhibits upon sticking to a trailing side face of the magnetic head slider in FIG. 7.

FIG. 9 is a diagram illustrating a behavior that a lubricant exhibits upon sticking to a trailing side face of the magnetic head slider in FIG. 7.

The second embodiment is intended to make the first embodiment more easily executable. In the magnetic head slider of the present embodiment, as shown in FIG. 7, an outer region 14 of the trailing side face 13, the outer region being adjacent to other faces 30 of the magnetic head slider, is coated with an oil-repelling agent, and an inner region 15 is coated with a lipophilic agent. Referring to FIG. 9 illustrating a mechanism of the magnetic head slider in the present embodiment, since a droplet 19 of the lubricant that is sticking to the trailing side face 13 will spread wetting, the droplet can be prevented from increasing in size, so a fall of the droplet onto the disk can be avoided. A difference in wettability between the regions 14 and 15 also prevents the sticking lubricant from spreading to an air bearing surface and other faces 30.

The region 14 in FIG. 7 is formed so as to constitute four sides of the trailing side face. It is likewise effective, however, to apply an oil-repelling agent only to a region adjoining the air bearing surface, as in FIG. 8, and a wetting spread of the lubricant can be prevented if the region 14 coated with an oil-repelling agent is formed at where the problems arising from a wetting spread are likely to occur.

(Third Embodiment)

A third embodiment of the present invention is described below with reference to FIGS. 10 and 11.

Figure 10:
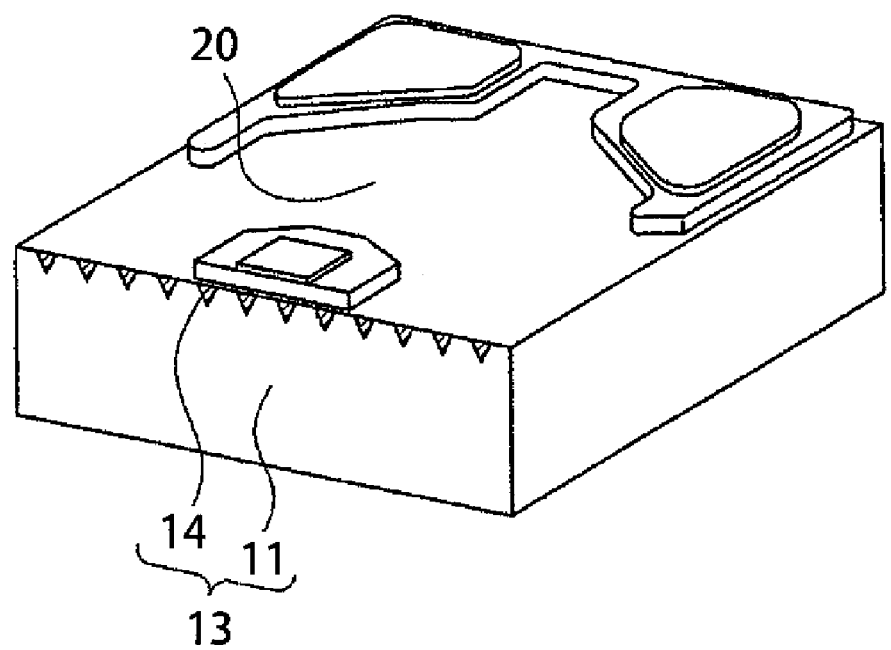
FIG. 10 is a perspective view showing a magnetic head slider structure according to a third embodiment of the present invention.

FIG. 10 is a perspective view showing a magnetic head slider structure according to the third embodiment of the present invention.

Figure 11:
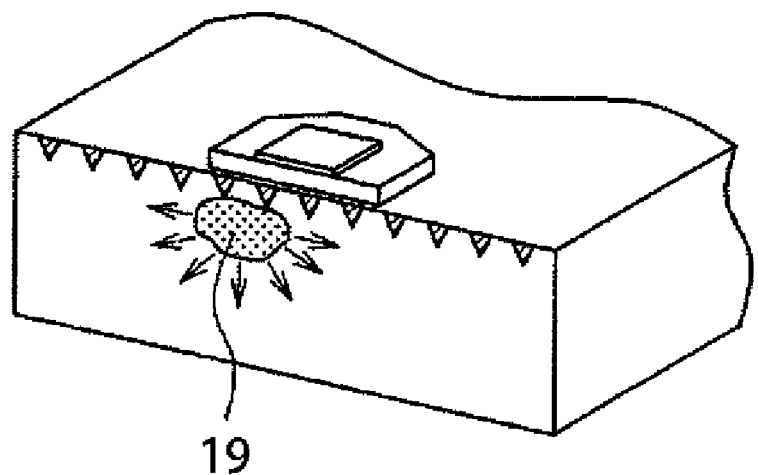
FIG. 11 is a diagram illustrating a behavior that a lubricant exhibits upon sticking to a trailing side face of the magnetic head slider in FIG. 10.

FIG. 11 is a diagram illustrating a behavior that a lubricant exhibits upon sticking to a trailing side face of the magnetic head slider in FIG. 10.

In the present embodiment, a trailing side face includes a wettability-reduced outer region constructed with a plurality of triangular shapes and disposed so that each of the triangles increases in area (i.e., so that the triangle has an expanded base) in a direction of an air bearing surface present on the magnetic head slider. In addition, surface wettability of a region other than the triangular region, at the trailing side face, is enhanced by increasing surface roughness or coating the surface with an oil-repelling agent. When droplets of the lubricant are formed on the trailing side face, the droplets will move towards a more easily wettable region. FIG. 11 illustrates a mechanism of the magnetic head slider in the present embodiment, and this mechanism is employed to prevent a droplet 19 of the lubricant from spreading to the air bearing surface. The above triangular shapes may each be replaced by a trapezoidal or semi-circular shape or any other shape that increases the area in the direction of the air bearing surface. Alternatively, each triangular portion may be provided on not only one side of the face 13, but also other sides.

(Fourth Embodiment)

A fourth embodiment of the present invention is described below with reference to FIG. 12.

Figure 12:
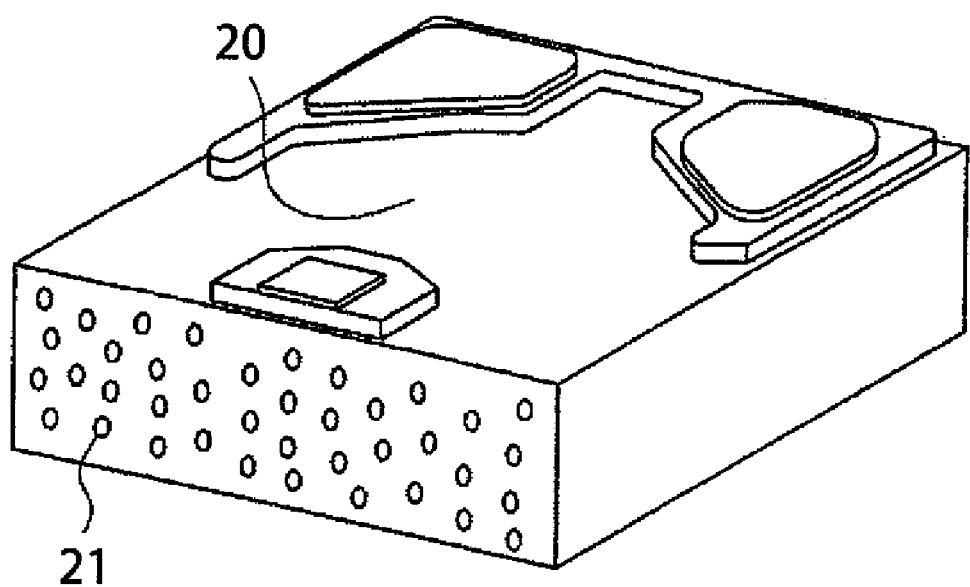
FIG. 12 is a perspective view showing a magnetic head slider structure according to a fourth embodiment of the present invention.

FIG. 12 is a perspective view showing a magnetic head slider structure according to the fourth embodiment of the present invention.

As shown in FIG. 12, the magnetic head slider according to the present embodiment includes a plurality of recesses in a trailing side face of the slider. These recesses entrap any droplets of a lubricant that have stuck to the trailing side face, and thereby prevents the droplets from falling and from spreading to an air bearing surface.

(Fifth Embodiment)

A fifth embodiment of the present invention is described below with reference to FIGS. 13 to 16.

Figure 13:
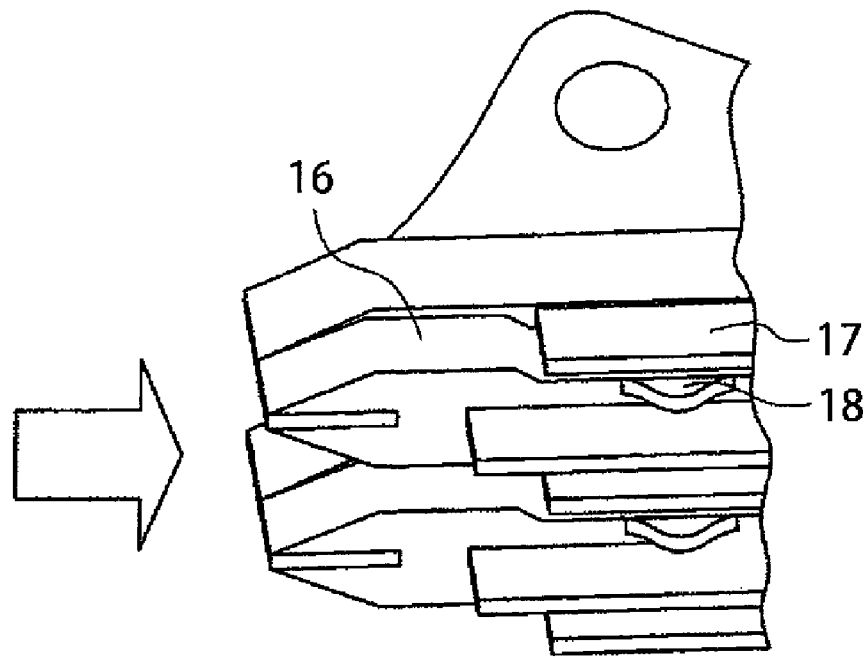
FIG. 13 is an enlarged perspective view that shows part of a load/unload region 7 illustrated in FIG. 17.
Figure 17:
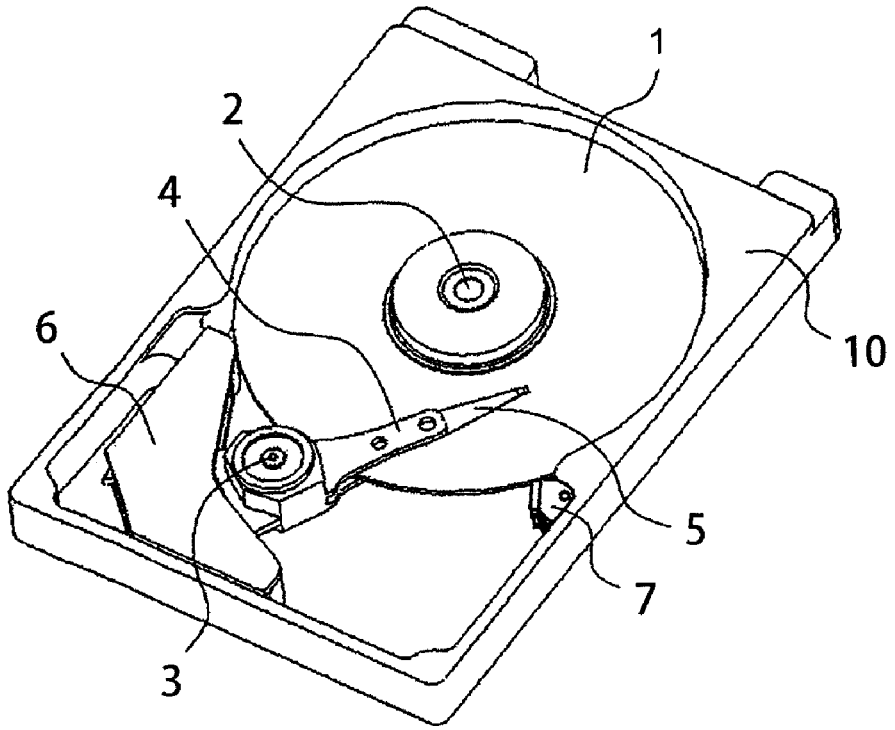
FIG. 17 is a configuration diagram of a general magnetic disk device.
Figure 18:
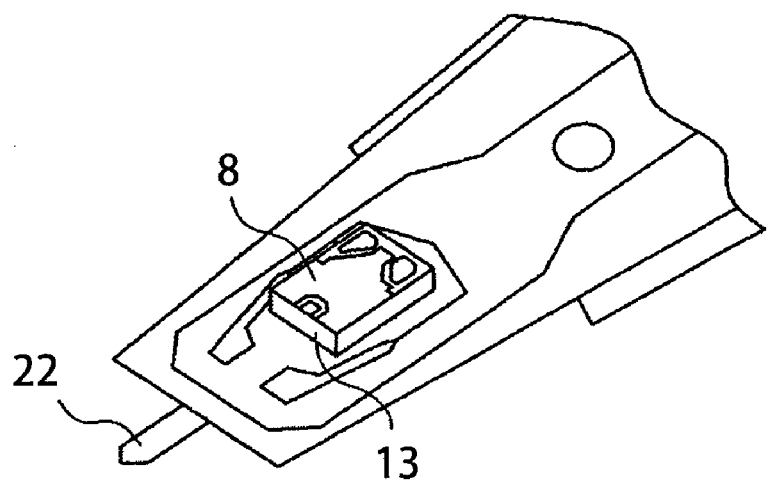
FIG. 18 is a perspective view showing a distal end of a magnetic head 5.
Figure 19:
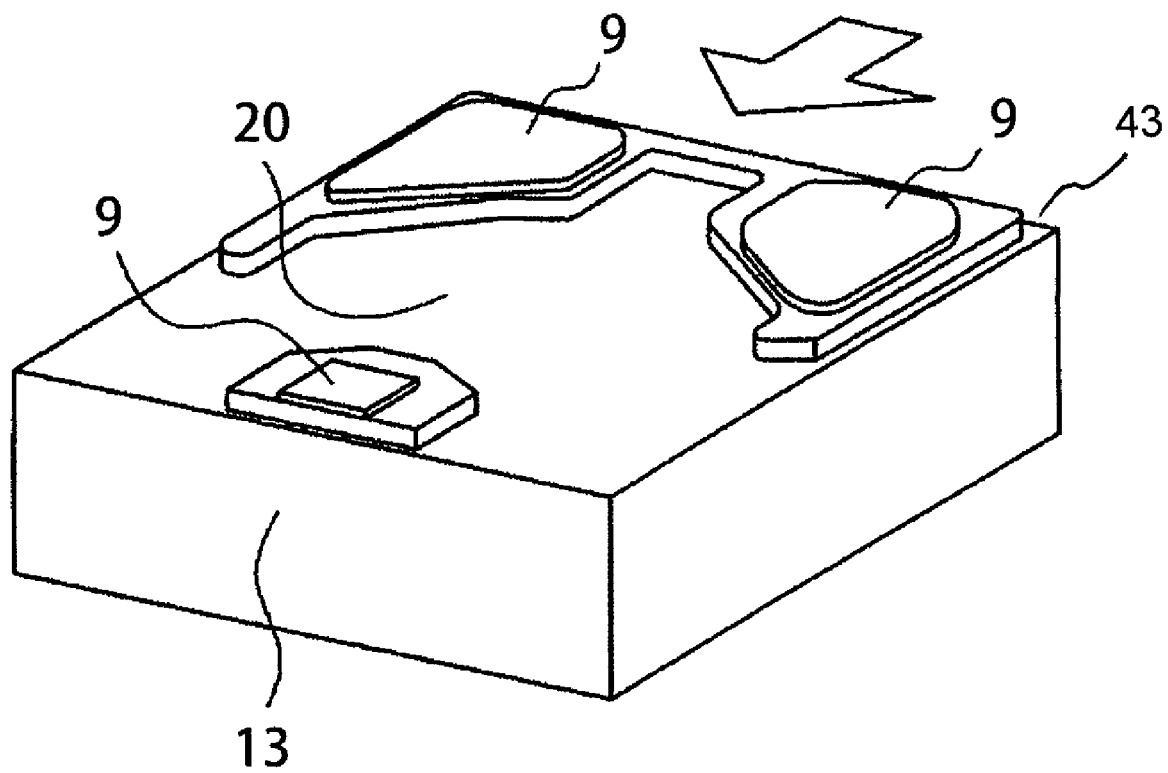
FIG. 19 is a perspective view of a magnetic head slider according to the conventional technique.

FIG. 13 is an enlarged perspective view that shows part of a load/unload region 7 illustrated in FIG. 17.

Figure 14:
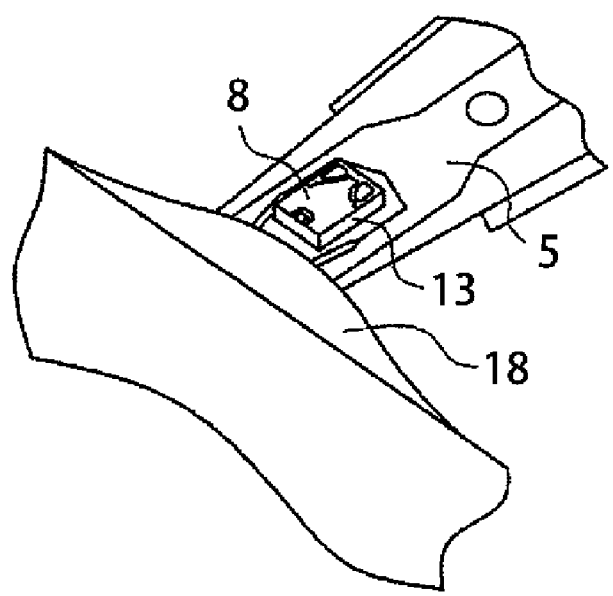
FIG. 14 is a perspective view of a magnetic head existing when stored in a load/unload region 7 according to a fifth embodiment.

FIG. 14 is a perspective view of a magnetic head existing when stored in a load/unload region 7 according to the present embodiment.

Figure 15:
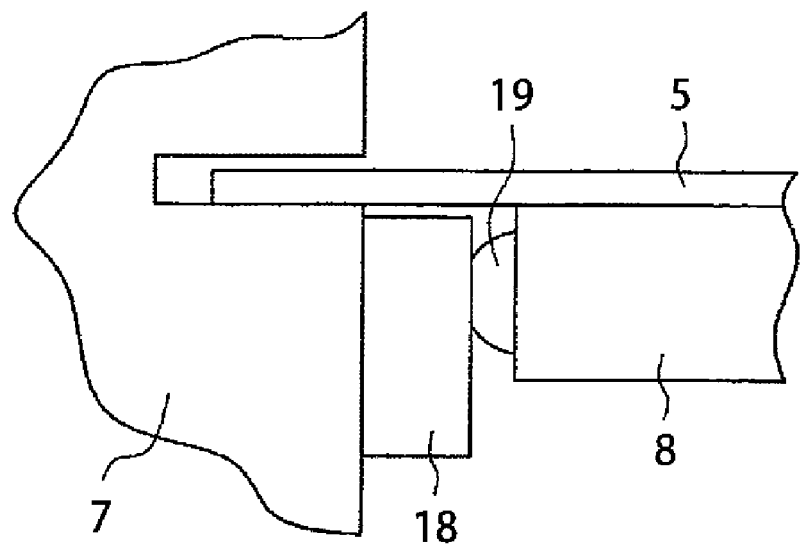
FIG. 15 is a side view that shows a relationship in position between a magnetic head slider and protrusion existing when the magnetic head is stored in the load/unload region 7, and a change in a position of a droplet of a lubricant that is sticking to a trailing side face of the magnetic head slider.

FIG. 15 is a side view that shows a relationship in position between a magnetic head slider and protrusion existing when the magnetic head is stored in the load/unload region 7, and a change in a position of a droplet of a lubricant that is sticking to a trailing side face of the magnetic head slider.

Figure 16:
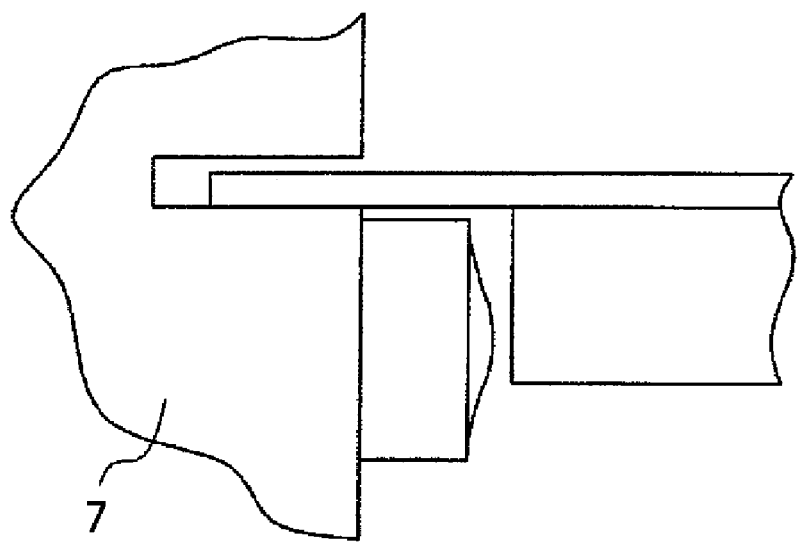
FIG. 16 is a side view that shows how a droplet of the lubricant moves from the lateral face of the magnetic head slider to the surface of the protrusion in the positional relationship of the slider and protrusion in FIG. 15.

FIG. 16 is a side view that shows how a droplet of the lubricant moves from the trailing side face of the magnetic head slider to the surface of the protrusion in the positional relationship of the slider and protrusion in FIG. 15.

When the magnetic head is located at a parking position, the present embodiment effectively removes the droplet of the lubricant that is sticking to the magnetic head slider.

A leading edge 22 of the magnetic head slider is introduced along a guide 16 from a direction of an arrow in FIG. 13, and inserted into a clearance existing between the guide 16 and a plate 17. A protrusion 18 is formed below the plate 17. The surface of the protrusion 18 is coated with a lipophilic agent or increased in roughness to be more wettable than the trailing side face of the magnetic head slider. The magnetic head when stored in the load/unload region 7 is shown in FIG. 14. Upon storage of the magnetic head, the trailing side face 13 of the magnetic head slider 8 faces the protrusion 18 in the load/unload region 7, thus forming a narrow space.

Advantageous effects and mechanism of the present invention are next described with reference to FIGS. 15 and 16. FIGS. 15 and 16 represent a relationship in position between the magnetic head slider 8 and protrusion 18 existing when the magnetic head 5 is stored in the load/unload region 7. Part of the droplet 19 sticking to the trailing side face of the magnetic head slider 8 will stick to the protrusion 18 when the magnetic head 5 is stored into the load/unload region 7. Since the surface of the protrusion 18 is more wettable than the trailing side face of the magnetic head slider, the droplet 19 will move to the protrusion 18, as shown in FIG. 16. The droplet of the lubricant that has stuck to the trailing side face of the magnetic head slider can thus be removed.

(Effects of the Invention that can be understood from the Embodiments)

As can be understood from the embodiments, the present invention provides a highly reliable magnetic disk device including magnetic disks each coated with a lubricant, the disk device being constructed to prevent a wetting spread of the lubricant to an air bearing surface and hence, a fall of the lubricant from a magnetic head slider.

What is claimed is:

1. A magnetic disk device comprising:
a magnetic disk having a surface coated with a lubricant; and
a magnetic head which reads and writes information from and on the magnetic disk, the magnetic head having a magnetic head slider formed with a distal end read/write element thereon, the magnetic head slider flying by an action of air during rotation of the magnetic disk;
wherein an inflow of air from a direction of a leading side face of the magnetic head slider enters a spatial gap between the magnetic head slider and the magnetic disk proximate to the leading side face, thus forming an air bearing film effect at an air bearing surface face of the magnetic head slider which faces the magnetic disk, and the air flows out from a trailing side face of the magnetic head slider; and
wherein the magnetic head slider has a wettability, in at least a part of an outer region defined on the trailing side face and adjoining other faces including the air bearing surface face of the magnetic head slider, which is lower than a wettability of at least one other region present at the trailing side face.

2. The magnetic disk device according to claim 1, wherein:
the at least part of the outer region of the trailing side face is worked into a protruding form, with wettability of the protrusion being reduced below the wettability of the at least one other region present at the trailing side face.

3. The magnetic disk device according to claim 1, wherein:
on the trailing side face, surface roughness of the at least part of the outer region is reduced below surface roughness of the at least one other region.

4. The magnetic disk device according to claim 1, wherein:
the at least part of the outer region of the trailing side face is coated with an oil-repelling agent, and the at least one other region at the trailing side faces is coated with a lipophilic agent.

5. The magnetic disk device according to claim 1, wherein:
the wettability-reduced portion of the at least part of the outer region on the trailing side face is constructed with a plurality of triangular shapes and disposed such that an area of each of the triangles increases in a direction of the air bearing surface face on the magnetic head slider.

6. The magnetic disk device according to claim 1, wherein the at least one other region present at the trailing side face of the magnetic mead slider include a recessed region.

7. The magnetic disk device according to claim 6, wherein the recessed region at the trailing side face extends in parallel to the air bearing surface face of the magnetic head slider.

8. The magnetic disk device according to claim 1, wherein the at least part of the outer region defined on the trailing side face extends along at least a portion of an entire circumference of the trailing side face which extends in parallel to the air bearing surface face and at least partially delimits an extent of the at least one other region.

* * * * *